3,255,230
CATALYTIC SYNTHESIS OF ARYL
CHLOROFORMATES
Raymond P. Kurkjy, Geneva, Switzerland, and Markus Matzner, Edison Township, and Robert J. Cotter, New Brunswick, N.J., assignors to Union Carbide Corporation, a corporation of New York
No Drawing. Filed July 3, 1962, Ser. No. 208,673
11 Claims. (Cl. 260—463)

The present invention relates in general to the preparation of chloroformate derivatives of phenols and more particularly to an anhydrous process for preparing dichloroformates of dihydric phenols.

Dihydric phenols have heretofore been reacted with phosgene to produce the dichloroformate derivatives thereof in a variety of reaction systems. For example it is known to react a phenol with phosgene in a reaction system containing an inert organic solvent and an aqueous alkali metal hydroxide as an acid binding agent. It is also known to react phenols with phosgene in the presence of an amphoteric metal catalyst. While these methods are generally effective, they necessitate the separation of contaminating reaction by-products and/or difficultly removable catalyst residues which seriously affect subsequent reactions in which the chloroformates are employed.

It is therefore the general object of the present invention to provide an improved anhydrous process for preparing aryl dichloroformates in which the reaction by-products are volatile and the catalysts are readily removed. Other and more particular objects will be obvious from the description of the invention appearing hereinafter.

In accordance with the present invention aryl dichloroformates are readily prepared by the process which compries contacting in an inert organic solvent medium a dihydric phenol free of reactive groups other than the two hydroxyl groups necessarily present with phosgene and a quaternary ammonium catalyst having at least one N-alkyl group having at least 3 carbon atoms.

The process is applicable to the preparation in nearly quantitative amounts of dichloroformate derivatives of the broad class of dihydric phenols suitably employed as reactants in the preparation of polycarbonate resins. In general such dihydric phenols are usually defined as being a mononuclear or polynuclear phenol in which the two hydroxyl groups are directly attached to different nuclear carbon atoms of the same or different aromatic nucleus. The class of suitable dihydric phenols is quite large and includes those compounds described in U.S. Patent 2,950,266—Goldblum and U.S. Patent 2,964,797—Pielstocker et al. which correspond to the general formula

I

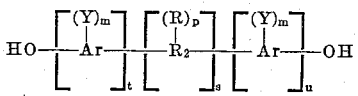

wherein R is hydrogen or a monovalent hydrocarbon radical, for example, alkyl radicals (e.g., methyl, ethyl, propyl, isopropyl, butyl, decyl, etc.), aryl radicals (e.g., phenyl, naphthyl, biphenyl, tolyl, xylyl, etc.), aralkyl radicals, e.g., benzyl, ethylphenyl, etc.), cycloaliphatic radicals (e.g., cyclopentyl, cyclohexyl, etc.) as well as monovalent hydrocarbon radicals containing inert substituents therein, such as halogen (chlorine, bromine, fluorine, etc.). It will be understood that where more than one R is used, they may be the same or different. $R_2$ is selected from the group consisting of an alkylene and alkylidene residue such as methylene, ethylene, propylene, propylidene, isopropylidene, butylene, butylidene, amylene, isoamylene, isoamylidene, cyclohexylidene, etc. $R_2$ can also be a silane radical or can be a polyoxy such as polyethoxy, polypropoxy, polythioethoxy, polybutoxy, polyphenylethoxy or polyorganosiloxy, for example, polydimethyl siloxy, polydiphenylsiloxy, polymethylphenyl siloxy, etc., or an ether, a sulfur-containing linkage such as sulfide, sulfoxide, sulfone, a carbonyl, a tertiary nitrogen or a silicon-containing linkage such as silane or siloxy. $R_2$ can also consist of two or more alkylene or alkylidene groups, such as above, separated by the residue of an aromatic nucleus, a tertiary amino radical, an ether radical or by a carbonyl radical, a silane or siloxy radical or by a sulfur-containing radical such as sulfide, sulfoxide, sulfone, etc. Other groupings which can be represented by $R_2$ will occur to those skilled in the art. Ar is the residue of an aromatic nucleus, Y is a substituent selected from the group consisting of (a) inorganic atoms, (b) inorganic radicals, and (c) organic radicals, (a), (b) and (c) being inert to and unaffected by the reactants and by the reaction conditions, $m$ is a whole number including zero to a maximum equivalent to the number of replaceable nuclear hydrogens substituted on the aromatic hydrocarbon residue, $p$ is a whole number including zero to a maximum determined by the number of replaceable hydrogens on $R_2$, $s$ ranges from zero to 1, $t$ and $u$ are whole numbers, preferably 1. When $s$ is zero, however, either $t$ or $u$ may be zero and not both.

In the dihydric phenol compound, the substituent Y may be the same or different, as may be the R. Among the substituents represented by Y are halogen (e.g., chlorine, bromine, fluorine, etc.) or oxy radicals of the formula OZ, where Z is a monovalent hydrocarbon radical similar to R, or monovalent hydrocarbon radicals of the type represented by R. Other inert substituents such as a nitro group can be represented by Y. Where $s$ is zero in Formula I, the aromatic nuclei are directly joined with no intervening alkylene or alkylidene or other bridge. The positions of the hydroxyl groups and Y on the aromatic nuclear residues Ar can be varied in the ortho, meta, or para positions and the groupings can be in a vicinal, asymmetrical or symmetrical relationship, where two or more of the nuclearly bonded hydrogens of the aromatic hydrocarbon residue are substituted with Y and the hydroxyl group. Examples of dihydric phenol compounds that may be employed in this invention include 2,2-bis-(4-hydroxyphenyl)-propane (bisphenol-A);
2,4'-dihydroxydiphenyl-methane;
Bis-(2-hydroxyphenyl)-methane;
Bis-(4-hydroxyphenyl)-methane;
Bis-(4-hydroxy-5-nitrophenyl)-methane;
Bis-(4-hydroxy-2,6-dimethyl-3-methoxyphenyl)-methane;
1,1-bis-(4-hydroxyphenyl)-ethane;
1,2-bis-4-hydroxyphenyl)-ethane;
1,1-bis-(4-hydroxy-2-chlorophenyl)-ethane;
1,1-bis-(2,5-dimethyl-4-hydroxyphenyl)-ethane;
1,3-bis-(3-methyl-4-hydroxyphenyl)-propane;
2,2-bis-(3-phenyl-4-hydroxyphenyl)-propane;
2,2-bis-(3-isopropyl-4-hydroxyphenyl)-propane;
2,2-bis-(4-hydroxynaphthyl)-propane;
2,2-bis-(4-hydroxyphenyl)-pentane;
3,3-bis-(4-hydroxyphenyl)-pentane;
2,2-bis-(4-hydroxyphenyl)-heptane;
Bis-(4-hydroxyphenyl)-phenyl methane;
Bis-(4-hydroxyphenyl)-cyclohexyl methane;
1,2-bis-(4-hydroxyphenyl)-1,2-bis-(phenyl) ethane;
2,2-bis-(4-hydroxyphenyl)-1,3-bis-(phenyl) propane;
2,2-bis-(4-hydroxyphenyl)-1-phenyl propane;

and the like. Also included are dihydroxybenzenes typified by hydroquinone and resorcinol, dihydroxydiphenyls such as 4,4'-dihydroxydiphenyl; 2,2'-dihydroxydiphenyl; 2,4'-dihydroxyliphenyl; dihydroxynaphthalenes such as 2,6-dihydroxynaphthalene, etc. Dihydroxy aryl sulfones such as bis-(p-hydroxyphenyl)-sulfone; 2,4'-dihydroxydiphenyl sulfone; 5'-chloro-2,4'-dihydroxydiphenyl sulfone; 5'-chloro-2',4-dihydroxydiphenyl sulfone; 5'-chloro-2',4-dihydroxydiphenyl sulfone; 3'-chloro-4,4' - dihydroxydiphenyl sulfone; bis (4-hydroxy phenyl) biphenyl disulfone, etc. The preparation of these and other useful sulfones is described in Patent 2,288,282—Huissman. Polysulfones as well as substituted sulfones using halogen, nitrogen alkyl radicals, etc., are also useful. Dihydroxy aromatic ethers such as p,p'-dihydroxydiphenyl ether;
the 4,3'-, 4,2'-, 3,3'-, 2,2'-, 2,3'-, etc., dihydroxydiphenyl ethers;
4,4'-dihydroxy-2,6-dimethyldiphenyl ether;
4,4'-dihydroxy-2,5-dimethyldiphenyl ether;
4,4'-dihydroxy-3,3'-di-isobutyldiphenyl ether;
4,4'-dihydroxy-3,3'-diisopropyldiphenyl ether;
4,4'-dihydroxy-3,2'-dinitrodiphenyl ether;
4,4'-dihydroxy-3,3'-difluorodiphenyl ether;
4,4'-dihydroxy-2,3'-dibromodiphenyl ether;
4,4'-dihydroxydinaphthyl ether;
4,4'-dihydroxy-3,3'-dichlorodinaphthyl ether;
2,4-dihydroxytetraphenyl ether;
4,4'-dihydroxypentaphenyl ether;
4,4'-dihydroxy-2,6-dimethoxydiphenyl ether;
4,4'-dihydroxy-2,5-diethoxydiphenyl ether, etc.

Mixtures of the dihydric phenols can also be employed and where dihydric phenol is mentioned herein, mixtures of such material are considered to be included. Preferably the dihydric phenol is a gem-bis-(hydroxyphenyl) alkane in which the central alkylidene radical contains from 1 to 6 carbon atoms.

The catalysts suitably employed are represented by the general formula $$[R_{4-n}(CH_3)_nN]_mX$$

wherein R is a straight or branched chain alkyl group containing from 3 to 30 carbon atoms, $n$ is an integer having a value of from 1 to 3 inclusive, X is an anion selected from the group consisting of $Cl^-$, $Br^-$, $I^-$, and $SO_4^{--}$, and $m$ is an integer having a value equal to the negative valence of X. Preferably R is a straight chain alkyl group containing from 10 to 30 carbon atoms.

Illustrative of the general class of catalysts described above are

Stearyltrimethylammonium chloride,
Distearyldimethylammonium bromide,
Propyltrimethylammonium iodide,
Dihexyldimethylammonium chloride,
Pentadecyltrimethylammonium bromide,
Di(hexadecyltrimethylammonium) sulfate,
Dipentadecyldimethylammonium iodide,
Di(myristyltrimethylammonium) sulfate,
Tridecylmethylammonium chloride,
Di(eicosyldimethylammonium) sulfate,
Tetradecyltrimethylammonium bromide, and the like. Particularly preferred are the quaternary ammonium chlorides, specifically stearyltrimethylammonium chloride and distearyldimethylammonium chloride.

The concentration of catalyst in the reaction system is not a narrowly critical factor. Generally amounts of catalyst of from about 0.005 to about 5 moles per mole of dihydric phenol present produce entirely satisfactory results. Preferably, however, the concentration is from about 0.01 to about 1.0 mole per mole of dihydric phenol.

The reaction between phosgene and the desired dihydric phenol or mixtures of dihydric phenols, is carried out in a liquid organic reaction medium which is inert toward the reactants, the catalyst, and the resulting dichloroformate derivative, and which in addition is a solvent for the reactants and the dichloroformate reaction product produced. Advantageously the inert organic medium is also a solvent capable of dissolving the catalyst completely, but it is not absolutely essential that all or even a major portion of the catalyst be dissolved. Suitable organic solvents include chlorobenzene, toluene, benzene, xylene, n-heptane, carbon tetrachloride, chloroform, methylene chloride, hexane, carbon disulfide, nitrobenzene, and the like.

The quantity of inert organic solvent is of course not narrowly critical as to the upper limit of concentration, but at least sufficient solvent should be present to provide a liquid reaction system so that intimate contact of the phosgene, dihydric phenol, and catalyst is accomplished.

The temperature of the reaction system is a critical factor in the process of this invention. Temperatures of from about 20° C. to about 135° C. comprise the operable range, with temperatures of from 40° C. to 130° C. being preferred. Particularly preferred temperatures are within the range of 90° C. to 130° C., especially during the latter portion of the reaction period. At temperatures somewhat higher than about 135° C., large quantities of undesirable reaction by-products are formed which include in part degradation products of the desired bisphenol dichloroformates.

According to the preferred embodiment of the present process, a dihydric phenol, inert organic solvent, phosgene, and the catalyst are admixed, at a temperature sufficiently low to prevent loss of the phosgene by volatilization, in proportions such that the phosgene is present in solution in the solvent medium in a molar concentration at least twice as great as the molar concentration of the dihydric phenol reactant. At a temperature of about 20° C., HCl, the sole reaction by-product, is slowly evolved. The rate of evolution of HCl increases rapidly as the temperature of the reaction system is increased to about 90° C. to 130° C., or to the reflux temperature of the solvent medium if the normal boiling point does not exceed 130° C. The reaction system is advantageously provided with a solid carbon dioxide reflux condenser in tandem with a water condenser which serves to return volatilized solvent and phosgene to the reaction system while permitting the HCl reaction product to escape.

A reaction time of about three hours at about 120° C. has been found generally to be of sufficient duration to achieve complete reaction. The time of reaction is not critical, however, and will vary somewhat with the temperature employed. The reaction mass is cooled and the catalyst, if unsoluble in the solvent at low temperatures, is filtered off. The resulting solution of dihydric phenol dichloroformate can be utilized directly, or if the pure isolated product is desired, the solvent can be removed by distillation and the residue further treated by conventional purification techniques. For example, a highly purified product can be obtained by dissolving the crude dihydric phenol dichloroformate in toluene, passing the solution over silica gel, eluting the silica gel with additional toluene, and thereafter removing the toluene under reduced pressure. Additional purification can be effected by the fractional distillation of the dichloroformate if liquid, or recrystallization if it is a solid.

Other modes of operation and a clearer understanding of the practice of the present invention are provided by the following examples. It is to be understood that the examples are in no way intended to be limitative of the proper scope of the invention.

*Example 1.—Prepartion of the dichloroformate of 2,2-bis(4-hydroxy phenyl)pronane*

In a glass reactor equipped with stirring means and a condenser cooled in part by solid carbon dioxide, a solution of 22.8 grams (0.1 mole) 2,2-bis(4-hydroxyphenyl)propane (bisphenol-A), 3.48 grams (0.01 mole) of stearyltrimethylammonium chloride, and 250 ml. chlorobenzene were admixed with 19.8 grams (0.2+mole) phosgene at 0° C. The resulting mixture was then heated with stirring at such a rate as to maintain a steady reflux of phosgene in the Dry-Ice condenser. The evolution of hydrogen chloride was detected at 40° by wet blue litmus held over the condenser exit. The temperature of the system rose quickly to 90–95° and then drifted upward slowly over a three-hour period to 125–130° C. At the end of this time, the rate of HCl evolution had markedly decreased. The reaction solution was cooled to room temperature, filtered to remove the catalyst, and the filtrate was stripped of chlorobenzene under reduced pressure. The residue was dissolved in 150 ml. of toluene and filtered to remove some additional catalyst. The toluene solution was then passed over a 3 x 30 cm. column of silica gel and eluted with an additional 250 ml. of toluene. The toluene solution was then stripped under reduced pressure to yield 33.2 g. (94%) of bisphenol-A dichloroformate which crystallized, M.P. 91–94°. This product was very pure as recovered, but was further purified (M.P. 93–95) by a recrystallization from 150 ml. of n-hexane.

*Example 2.—Preparation of hydroquinonedichloroformate*

Using the same apparatus, reaction conditions, molar proportions, and formulation of reactants as in Example 1 except that hydroquinone was substituted for the bisphenol A therein, 21.5 grams (92% of theoretical) of the pure dichloroformate of hydroquinone were prepared. The product melted at 100–101° C. and could be crystallized from n-heptane.

*Example 3.—Preparation of the dichloroformate of 2,2-bis(4-hydroxyphenyl) methane*

In a glass reactor equipped with stirring means and a condenser system permitting the egress of HCl only from the reactor, a solution of 20.0 grams (0.1 mole) of 2,2-bis(4-hydroxyphenyl) methane, 0.05 mole distearyldimethylammonium chloride, and 250 ml. of carbon tetrachloride is admixed with 19.8 grams phosgene at 0° C. The resulting mixture is then heated with stirring at such a rate as to maintain a steady reflux of phosgene. The reaction is maintained for a period of about 4 hours at a temperature of 76° C. At the end of this period, the evolution of HCl will have essentially ceased. The product dichloroformate is isolated according to the method of Example 1 and exhibits a melting point of 60–61° C. The product can be recrystallized from n-hexane.

*Example 4.—Preparation of dichloroformate of 2,2-(4,4'-dihydroxy-3,3',5,5'-tetrachlorodiphenyl) propane*

Using the same apparatus, reaction conditions, molar proportions, and formulation of reactants as in Example 1 except that tetrachlorobisphenol-A was substituted for the bisphenol-A therein, and the quantity of stearyltrimethylammonium chloride was increased to 8.7 grams (0.025 mole), 47.3 grams of the dichloroformate of tetrachlorobisphenol-A were formed, which when isolated and recrystallized from n-hexane had a melting point of 164–166° C.

*Example 5*

The dichloroformate having the structural formula

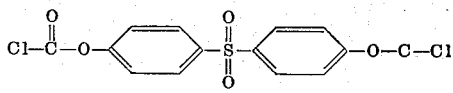

is readily prepared using the procedure and apparatus of Example 1, and using as the bisphenol reactant bis(4-hydroxyphenyl) sulfone, and using as the catalyst di(dodecyltrimethylammonium) sulfate.

*Example 6*

The dichloroformate having the structural formula

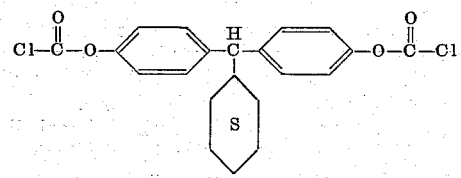

is prepared using the procedure, apparatus and formulation of Example 1, except that the dihydric phenol reactant employed is 0.1 mole bis(4-hydroxyphenyl) cyclohexyl methane, and the catalyst is myristyltrimethylammonium bromide.

The dihydric phenol dichloroformates of this invention have extensive utility as intermediates in the preparation of polycarbonate and polyurethane resins. For example, equimolar proportions of bisphenol-A and a dichloroformate prepared by this invention can be reacted in the presence of an aqueous sodium hydroxide solution to yield high molecular weight polycarbonate resins.

Embodiments other than those illustrated by the examples hereinabove will be obvious to those skilled in the art and are considered to be within the scope of the invention. For example the dihydric phenol, catalyst, and inert organic solvent can just be admixed and the phosgene thereafter introduced into the system through a gas inlet jet located below the surface of the reaction mixture.

What is claimed is:

1. The process for preparing a dihydric phenol dichloroformate which comprises reacting in an anhydrous inert organic solvent medium at a temperature of from about 20° C. to about 130° C. a dihydric phenol selected from the class of mononuclear and polynuclear dihydric phenols in which two hydroxyl groups are directly attached to different nuclear carbon atoms of the same or different aromatic nucleus, phosgene and a catalytic amount of a compound which is at least partially soluble in said inert organic solvent medium and which has the formula $$[R_{4-n}(CH_3)_nN]_mX$$

wherein R is an alkyl group containing from 10 to 30 carbon atoms, $n$ is an integer having a value of from 1 to 3, X is an anion selected from the group consisting of chlorine, bromine, iodine, and sulfate, and $m$ is an integer having a value equal to the negative valence of X and wherein the molar concentration of the phosgene is at least twice the molar concentration of the dihydric phenol present in the solvent medium.

2. Process according to claim 1 wherein X is chlorine and $m$ has a value of 1.

3. Process according to claim 1 wherein X is bromine and $m$ has a value of 1.

4. Process according to claim 1 wherein X is iodine and $m$ has a value of 1.

5. Process according to claim 1 wherein X is sulfate and $m$ has a value of 2.

6. Process according to claim 1 wherein the dihydric phenol is a gem-bis(4-hydroxyphenyl)alkane having from 1 to 6 carbon atoms in the central alkylidene radical.

7. Process according to claim 1 wherein the reaction temperature is from about 40° C. to about 130° C.

8. Process for preparing a dihydric phenol dichloroformate which comprises reacting in an anhydrous inert organic solvent medium at a temperature of from about 90° C. to about 130° C. a dihydric phenol selected from the class of mononuclear and polynuclear dihydric phenols in which the two hydroxyl groups are directly attached to different nuclear carbon atoms of the same or different aromatic nucleus, phosgene, and stearyltrimethylammonium chloride, said stearyltrimethylammonium chloride being at least partially soluble in said inert organic solvent medium and which is present in an amount of from about 0.01 to about 1.0 mole per mole of dihydric phenol present and wherein the molar concentration of the phosgene is at least twice the molar concentration of the dihydric phenol present in the solvent medium.

9. Process according to claim 8 wherein the dihydric phenol is 2,2-bis(4-hydroxyphenyl)propane.

10. Process for preparing a dihydric phenol dichloroformate which comprises reacting in an anhydrous inert organic solvent medium at a temperature of from about 90° C. to about 130° C. a dihydric phenol selected from the class of mononuclear and polynuclear dihydric phenols in which the two hydroxyl groups are directly attached to different nuclear carbon atoms of the same or different aromatic nucleus, phosgene, and distearyldimethylammonium chloride, said distearyldimethylammonium chloride being at least partially soluble in said inert organic solvent medium and which is present in an amount of from abou 0.01 to about 1.0 mole per mole of dihydric phenol present and wherein the molar concentration of the phosgene is at least twice the molar concentration of the dihydric phenol present in the solvent medium.

11. Process according to claim 10 wherein the dihydric phenol is 2,2-bis(4-hydroxyphenyl)propane.

References Cited by the Examiner
UNITED STATES PATENTS 2,837,555  6/1958  Lee _____ 260—463

FOREIGN PATENTS 959,497  3/1957  Germany.

OTHER REFERENCES

Wagner et al., "Synthetic Organic Chemistry," p. 483 (1953).

CHARLES B. PARKER, *Primary Examiner.*

A. LOUIS MONACELL, IRVING MARCUS, *Examiners.*